March 22, 1966  J. ENDRES  3,241,316
EXHAUST PRESSURE DEPRESSION APPARATUS FOR INCREASING THE
POWER GENERATING EFFICIENCY OF HEAT ENGINES
Filed March 15, 1965  2 Sheets-Sheet 1

INVENTOR
JOHANN ENDRES

Strauch, Nolan, Neale,
Nies and Bronaugh
ATTORNEYS

INVENTOR
JOHANN ENDRES

Strauch, Nolan, Neale,
Nies and Bronaugh
ATTORNEYS

United States Patent Office 3,241,316
Patented Mar. 22, 1966

3,241,316
EXHAUST PRESSURE DEPRESSION APPARATUS FOR INCREASING THE POWER GENERATING EFFICIENCY OF HEAT ENGINES
Johann Endres, Burgern 138½, Wackersberg, near Bad Toelz, Germany
Filed Mar. 15, 1965, Ser. No. 439,666
Claims priority, application Germany, Mar. 14, 1960, E 19,030
8 Claims. (Cl. 60—39.5)

This application is a continuation-in-part of co-pending application Serial No. 123,602, filed March 3, 1961, now abandoned.

The present invention relates to the more efficient generation of power in heat engines by utilizing kinetic energy of exhaust gases from the engine in a pressure depression device which facilitates exhaust gas exit and reduces output losses.

The efficiency of heat engines using a drop of pressure down to the level of atmospheric pressure for generation of power is detrimentally effected by the exhaust losses.

The present invention avoids or effectively negates the well known exhaust loss disadvantage of heat engines by creating a new constructional basis to increase the engine performance and efficiency by means of a drop of exhaust back pressure. With regard to the invention, the new method is based upon the performance of a new type of pressure depression diffusion nozzle construction located on the downstream end of the exhaust duct of a heat engine, e.g., combustion engine, gas turbine, etc., and, by means of the generation of partial vacuum pressure in the nozzle construction, creates a high magnitude of pressure drop within the fluid stream in the exhaust duct. In this way the kinetic energy of the exhaust gases is utilized in conjunction with a more efficient pressure depression diffusor to reduce exhaust losses for an increase of performance and efficiency of the power generating plants.

To this end, I provide a gas stream or jet, means for discharging a stream of fluid, an exhaust duct, a plurality of annular rearwardly convergent, axially spaced apart nozzle members, secured to the inner periphery of a sleeve or housing attached as an extension of the exhaust duct, each of the nozzle members terminating in an orifice and, the diameters of the orifices dimensioned so as to progressively increase in the downstream direction with the furthermost orifice in the downstream direction being in communication with the atmosphere. Adjacent nozzle members along with the exhaust duct form annular chambers conaining a gaseous fluid such as the surrounding air or exhausting gases, and the chambers have annular openings, between nozzle orifices, in communication with the stream of exhaust gases, so that the high velocity exhausting gas stream produces a partial vacuum in the nozzles.

Accordingly, a primary object of this invention resides in the provision of a novel exhaust back pressure depression apparatus, of the kind described, for use in combination with the exhaust structure of power generating plants, e.g., internal combustion engines, gas turbines and others.

A further object resides in the provision of a pressure depression apparatus deriving operative power from kinetic energy in the exhaust of a heat engine to generate an exhaust back pressure lower than would otherwise exist by enabling expansion of the exhaust gases across the working component of the engine to pressures which are lower by virtue of the presence of said apparatus to thereby increase the limit of performance and degree of efficiency of the heat engine.

Another object resides in the provision of one or more pressure depression chambers at the downstream end of a heat engine exhaust duct with openings of such chambers in fluid communication with the exhaust duct outlet and having ejection nozzle pumping means utilizing kinetic energy of the exhaust from the exhaust duct to reduce the pressure in the chambers to below atmospheric to thereby increase the operating pressure differential across the power producing components of the heat engine and thus to increase the power output and efficiency of the heat engine.

A further object resides in the novel method of increasing heat engine output performance and efficiency by utilizing kinetic energy of a gas jet to generate low pressure forces which in turn at stable flow are propagated through the exhaust stream to decrease the exhaust back pressure immediately behind the working means of the engine to increase the pressure gradient across the working component and thereby increase the engine output power.

Further novel features and other objects of this invention will become apparent from the following detailed description, discussion and the appended claims taken in conjunction with the accompanying drawings showing preferred structures and embodiments in which:

It is to be understood that in the following description, terms such as front and rear and corresponding expressions, relate to the direction in which the stream issues from the exhaust duct, i.e., the principal nozzle, the one opening to atmosphere, is located at the rear end of the pressure depression apparatus, and the duct from which the exhaust stream is primarily discharged, is in front of the pressure depression apparatus.

Preferably, I provide a set of subsidiary nozzles between the principal nozzle at the rear end and the exhaust duct outlet. The outlet orifices of the nozzles are arranged co-axially with respect to the stream, and to each other, and are nested one within the other so that the vacuum gradually increases and becomes a maximum in the first subsidiary nozzles located near the outlet of the exhaust duct. The areas of the annular clearances defined by the outlet pipe of the first subsidiary nozzle, and the outlet end of the stream, and by each pair of nested outlet pipes, increase progressively toward the rear of the apparatus, as required by the expansion of the streaming fluid.

I provide means at or near the front end of the apparatus to produce a gas stream, i.e., compressor means or turbine means with an exhaust duct, or an air turbine with its outlet connected to the vacuum chambers of the first subsidiary nozzles for the generation of power by utilizing the drop of pressure from the atmospheric pressure at the inlet of the air turbine to the vacuum of the chambers of the nozzles.

Figure 1:
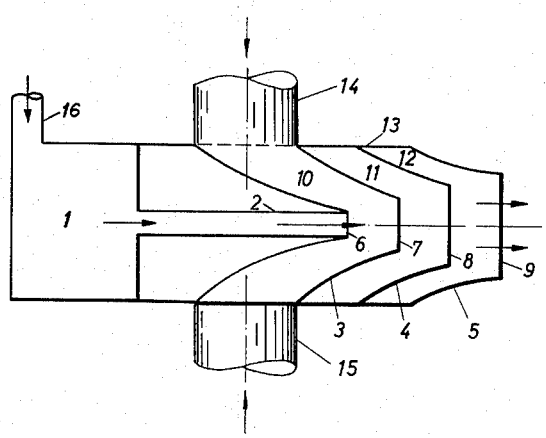
FIGURE 1 is an axial section of a set of nozzles showing one form of a pressure depression diffusor structure in accord with my invention.

In FIGURE 1 a compressed gas chamber 1 is furnished with an exhaust duct 2, followed by nozzles 3, 4, 5. All nozzles terminate in an orifice. The diameters of the orifices 6, 7, 8, 9, progressively increase in the downstream direction with the furthermost downstream orifice 9 communicating with the atmosphere. Chambers 10, 11 and 12, are laterally closed against the atmospheric pressure by a shrouding sleeve 13. The effective vacuum (low pressure) of the chamber 10 is in fluid communication with an operating engine (not shown) by means of conduits 14 and 15. Via delivery pipe 16, compressed gas is conveyed to the compressed gas chamber 1. The injector effect of the compressed gas jet passing from the nozzle 2, causes an intensive effect of suction which materializes in the formation of a vacuum pressure (sub-atmospheric pressure) in the chambers 10, 11 and 12. At the same time this vacuum pressure within the chambers 11 and 12 causes a further or additional expansion together with a coincidental drop of pressure within the jet stream and within the chamber 10. The pressure drop propagates in all directions as long as flow is subsonic.

Figure 2:
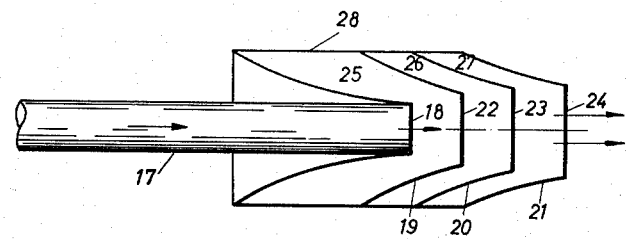
FIGURE 2 is an axial section of an exhaust duct with a pressure depression nozzle structure.

FIGURE 2 depicts the utilization of a set of pressure depression nozzles for the enlargement of the drop of exhaust pressure in steady flow combustion type engines. The exhaust gases leave the engine exhaust duct 17 through its exit orifice 18 and stream progressively through the downstream series of nozzles 19, 20 and 21, which have respective jet orifice diameters 22, 23 and 24. Flow past the sub-pressure chambers 25, 26 and 27, results in an increased drop of pressure, generated and maintained by the kinetic energy present within the steady flow exhaust jet stream which low pressure propagates upstream and leads to an increase in the working pressure gradient with an accompanying increase of output power of the combustion type engine. The effect of the series of downstream nozzles consists of the generation of a lower pressure, to which the exhaust jet stream expands down to the critical pressure ratio, within the following series of nozzles at and behind the exhaust duct orifice diameter 18 by means of the injector type effect of the kinetic energy present in the steady flow exhaust jet stream. Because of the increased drop of pressure, the speed of the jet stream within the exhaust exit orifice 18, and inherently within the exhaust pipe, is increased. At the same time the weight of gas passing through the exhaust duct will be increased. Corresponding to the increased passing of gas, a raise in limit of performance and in degree of efficiency of the engine materializes, depending on the increase of the falling pressure gradient down to the critical pressure ratio at the jet orifice of the exhaust duct nozzle 18. The process of suction which initially reduces the pressure in the nozzle chambers occurs very rapidly upon first starting the engine due to the limited volume of the nozzle chambers. The pressure in the depression chambers stabilizes very rapidly and once the low pressure does reach a stabilized value the degree of efficiency of the injector has no effect.

Figure 3:
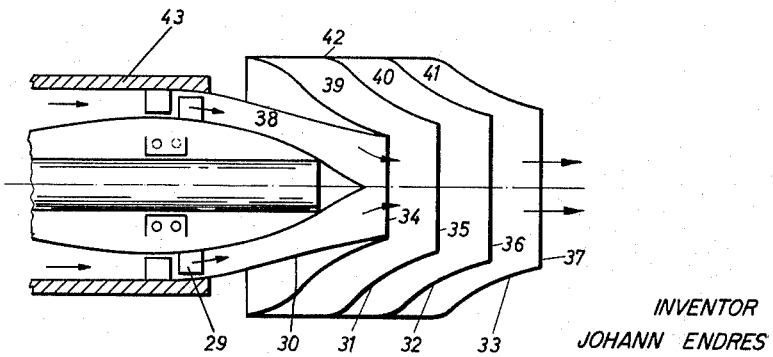
FIGURE 3 is an axial section of the turbine rotor and exhaust duct of a gas turbine with a pressure depression nozzle structure attached thereto.

FIGURE 3 illustrates utilization of a set of pressure depression nozzles and chambers for the enlargement of the pressure gradient across a turbine rotor of a normal gas turbine installation. The exhaust gases leave the turbine rotor 29 via exhaust duct 30 and nozzles 31, 32 and 33. The nozzles with progressively enlarging jet orifice diameters 34, 35, 36 and 37, by utilizing the kinetic energy of the gas stream in the well known ejector principle, creates sub-atmospheric (vacuum) pressures in the nozzle chambers, effecting: (a) an enlargement of the falling pressure gradient total within the exhaust jet stream, (b) an increase of the speed of the jet stream within the exhaust duct 30, and (c) an increase of the weight of gas passing. During this effect the maximum value of the drop of pressure in the depression diffusor is propagated upstream and appears within the exhaust chamber 38, leading to a strong increase of the falling pressure gradient across the turbine rotor, and therefore to an increase in limit of performance and degree of efficiency in normal gas turbine installations. In this manner, kinetic energy contained in the turbine exhaust gases will be utilized, by means of a series of progressive pressure depression nozzles and chambers connected to and following the downstream end of the primary engine exhaust duct, to generate a sub-atmospheric (vacuum) pressure and to increase the falling gradient of pressure across the turbine rotor, thus increasing the limit of performance and the degree of efficiency. Again the set of nozzle chambers is laterally enclosed against the outside pressure by a shrouding barrel or sleeve 42. The turbine rotor is arranged inside of the turbine housing 43.

Figure 4:
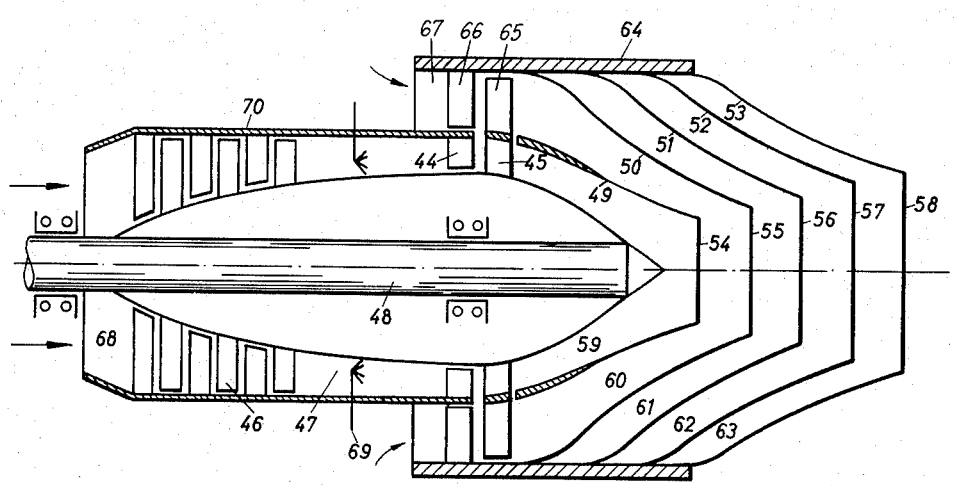
FIGURE 4 is an axial section of a gas turbine with an exhaust duct in combination with an air turbine and with a pressure depression nozzle structure.

In FIGURE 4 the utilization of a set of pressure depression diffusor nozzles and chambers for a two-stage gas turbine engine, consisting of an inside combustion stage and an outside air impeller stage, is illustrated. The gas turbine engine has stator 44 and a rotor 45 of the inside combustion stage, which consists of a conventional impeller 46, a combustion chamber 47, and a turbine shaft 48. The exhaust gases stream through the depression diffusion nozzles 50, 51, 52 and 53 with their jet orifice diameters 55, 56, 57 and 58, generate, as described for the previous embodiments herein, by means of their kinetic energy, vacuum or sub-atmospheric pressures within the nozzle chambers 60, 61, 62 and 63. In such process, at the same time, the upstream chamber 59 is the exhaust channel for the inside combustion stage of the turbine and the next successive downstream nozzle chamber 60 is the expansion channel for an outside air impeller stage. The set of pressure diffusion nozzles 64 causes an increase of the drop of the turbine exhaust pressure for the inside stage, and, besides this, will generate a pressure gradiant between the outside pressure and the lower than atmospheric pressure in the nozzle chambers furnishing power needed for the output of the outside air impeller stage. The outside impeller stage consists of the air impeller rotor 65, the stator or guide wheel 66 and the air intake scoop 67. Turbines 45 of the inside stage and turbine 65 of the outside stage 65 are combined into a one piece rotor design. In this way the work efficiency of the outer air impeller rotor has a beneficial effect on the inner gas turbine rotor output and depends on the kinetic energy of the gas exhaust of the inside combustion stage. Component 68 represents the air intake scoop of the inside combustion stage, 69 is the fuel injection installation for the combustion chamber, and 70 is the housing of the inner power plant.

Figure 5:
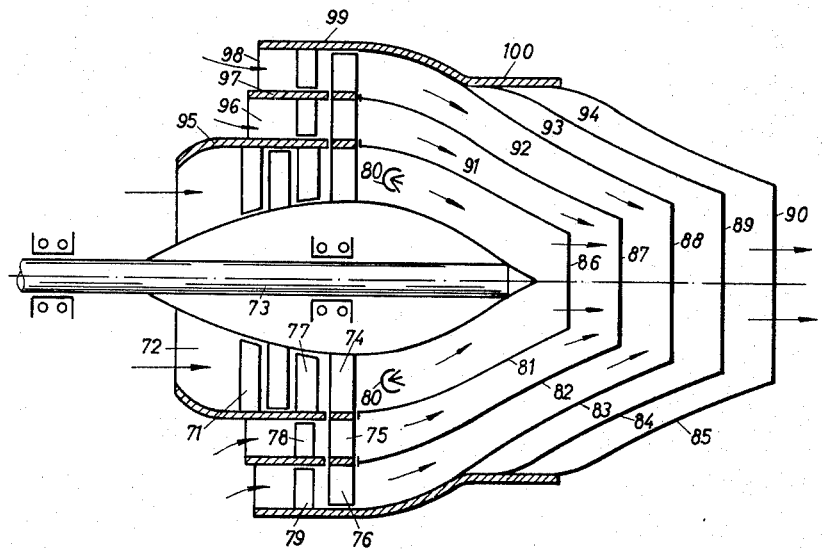
FIGURE 5 is an axial section of a gas turbine with an exhaust duct in combination with a two-staged air turbine with a pressure depression nozzle structure.

The FIGURE 5 embodiment illustrates utilization of a a set of pressure depression nozzles and chambers for a combination of an inner air compressor stage—consisting of a turbo compressor 71, an air intake scoop 72, and a turbine shaft 73—and a dual outer air impeller stage concentrically arranged around the last blade wheel 74 of the compressor rotor 71 consisting of the outer turbine stages 75 and 76 with respective guide vanes 77 and 78 mounted in front of the turbine stages. The inner impeller wheel 74 with an upstream stage and the outer turbine stages 75 and 76 have been combined into a one piece rotor. Immediately downstream of the last impeller stage of compressor rotor 71 is a heat injection device 80. The hot gas blast passing through the downstream series mounted set of pressure depression nozzles, consisting of the exhaust duct 81 and nozzles 82, 83, 84 and 85, with their orifice diameters 86, 87, 88, 89 and 90 progressively widening in the downstream direction, generates a sub-atmospheric (vacuum) pressure within the nozzle chambers 91, 92, 93 and 94. The two upstream chambers 91 and 92 are connected to respective outer turbine stages 75 and 76. Turbine stages 75 and 76 utilize the falling gradient of pressure between outside, atmospheric pressure and sub-atmospheric depression nozzle pressure, generated by the set of nozzles. Thus a work efficiency is generated, which is accepted by the turbine shaft 73. Other parts of the engine are the compressor casing 95, the air intake scoop 96 for the turbine stator 78, the intermediate turbine housing 97, and the outside turbine housing 99. The shrouding barrel or sleeve 100 closes the set of nozzles laterally against outside, atmospheric pressure.

Within the described and disclosed representations, several examples have been exhibited, to demonstrate, in which manner kinetic energy, present in the high velocity and pressures in exhaust gas streams can be utilized to increase the limit of performance and the degree of efficiency by means of sets of nozzles with vacuum pressure, preferably for gas turbine engines. In principle, the process in question is the reduction of the outlet losses in jet engines and related mechanisms. The tests made have clearly revealed that the generation of partial vacuum in the nozzles and the reaction, resulting from progressively reduced pressure in a set of nozzles, and prolongated expansion within the gas stream, is significant and of considerable technical value.

The drop of pressure across working components of a power plant results in an improvement of the performance and efficiency of power generating plants.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a fluid pressure operated engine for the generation of power: an engine exhaust pressure depression diffusor with a fluid confining duct; means including an entrance injection nozzle producing a gas stream in fluid communication with and to flow into and through said confining duct; said depression diffusor further comprising a plurality of annular, rearwardly convergent, axially spaced apart nozzle members secured to the inner periphery of said fluid confining duct, each of said nozzle members terminating in an orifice, the diameters of said orifices of succesive downstream nozzle members progressively increasing in diameter starting from said injection nozzle, the furthermost downstream orifice being in communication with the atmosphere and its associated nozzle member constituting the principal nozzle and located at the rear end of the depression diffusor; an engine exhaust chamber at the upstream end of said depression diffusor in fluid communication with the fluid exhaust from said engine; the nozzle members between said injection nozzle and said principal nozzle being designated subsidiary nozzles; gas stream flow through said injection nozzle producing a partial vacuum in said principal nozzle and in each of said subsidiary nozzles, the nozzle outlet portions of said nozzle members being so nested with respect to each other and to said injection nozzle, that the vacuum is gradually increased from said principal nozzle member to the first subsidiary nozzle member; and adjacent ones of said nozzle members, along with the portions of said exhaust duct therebetween, forming annular chambers, said chambers having fluid communication only with the stream of propulsive gases through annular openings.

2. In an engine combination for the generation of power, as defined in claim 1, said engine comprising a combination gas turbine-air turbine engine wherein the upstream end of said depression diffusor is in fluid communication to receive the exit fluid stream of the propulsive gases from said air turbine and the exhaust gases from said gas turbine and to create a pressure depression on the exhaust side of both said air turbine and said gas turbine, said gas turbine being drive coupled with said air turbine.

3. In an engine combination for the generation of power, as defined in claim 1, said engine comprising a fluid pressure operated turbine plant wherein the upstream end of said depression diffusor is in fluid communication to receive the exit fluid stream of the propulsive fluid of said turbine plant; a compressor comprises a portion of the means connected to discharge fluid into and through said injection nozzle producing the primary depression diffusor operating stream; fuel injection means are disposed in said exhaust duct between said compressor and the orifice of said injection nozzle; and a shaft providing a power connection between said compressor and said turbine plant.

4. In a gas turbine plant combination including a turbine rotor for generation of rotative energy, an exhaust duct to confine and direct exiting turbine rotor exhaust gases; the improvement comprising a pressure depression diffusor means connected in fluid flow communication with said exhaust duct to utilize kinetic energy of flowing exhaust gases exiting from said turbine rotor to create a continual pressure depression immediately at the downstream side of said turbine rotor during turbine plant operation to thereby increase the gas turbine plant operating pressure ratio, said depression diffusor means comprising: a set of annular coaxial pressure depression chambers having walls providing axially directed and axially spaced apart convergent nozzle members directed in a downstream direction and with nozzle orifices at an inner coaxial periphery of axially spaced walls and said pressure depression chambers otherwise being imperforate; each nozzle member, excepting the furthermost downstream nozzle member, which opens to atmosphere, being axially projected into the next downstream nozzle member and successive nozzle members, proceeding in a downstream direction, having orifice diameters larger than the immediately preceding upstream nozzle member; a fluid injection nozzle member having an orifice diameter smaller than those of said diffusor nozzle members, projected coaxially into the upstream end of said diffusor means and in direct fluid communication with said exhaust duct whereby the gas turbine exhaust stream flowing through said injection nozzle and said diffusor means creates a constant pressure depression in said diffusor means, effective to reduce exhaust back pressure on said turbine rotor.

5. A gas turbine plant as defined in claim 4, wherein means are provided downstream of said turbine rotor for introducing and burning fuel to add heat energy to said exhaust stream within said depression diffusor means.

6. A gas turbine plant as defined in claim 4, wherein said depression diffusor means comprises at least four chambers with nozzle members, at least the two downstream chambers being pressure depression chambers, said turbine plant includes a gas turbine rotor and an air turbine rotor concentric with and fixed to said gas turbine rotor; the first upstream chamber of said depression diffusor means is connected in direct fluid communication with and receives the exhaust stream flow from said gas turbine rotor and an intermediate chamber of said diffusor means upstream of said pressure depression chambers is connected in direct fluid communication with and receives exit stream flow from said air turbine rotor; all pressure depression chambers having a fluid communication path open only through their inner peripheral nozzle members into and through successive downstream nozzle members to the atmosphere.

7. In combination with a fluid driven engine having power generating components operable as a result of a pressure drop of engine operating fluid across said components and into an exhaust chamber, a pressure depression diffusor connected to receive all engine operating fluid exiting from said engine through said exhaust chamber and to create a continual pressure depression in said exhaust chamber and at the exit side of said components, said diffusor comprising: an outer circumscribing peripheral duct containing a plurality of annular rearwardly convergent, axially spaced apart, coaxial nozzle members secured to the inner surface of said duct; each nozzle member terminating in a rearwardly disposed orifice and the diameters of the orifice increasing in the downstream direction and the furthermost downstream orifice being in fluid communication directly to atmospheric pressure; adjacent pairs of nozzle members, in cooperation with said duct, constituting annular chambers having annular openings defined by the nozzle openings and otherwise being closed; means providing fluid communication between the furthest upstream nozzle chamber and said exhaust chamber; and means directing a coaxial stream of high velocity fluid into the upstream end of said diffusor, through and out of the downstream nozzle orifice of said diffusor.

8. The combination as defined in claim 7, wherein said means directing a coaxial stream of high velocity fluid into the diffusor is an exhaust ejection nozzle disposed between said exhaust chamber and said entrance to said diffusor to direct all of said engine exhaust fluid as an ejection jet coaxially through said diffusor, the kinetic energy of said exhaust fluid serving to create the continual pressure depression within said diffusor which in turn creates a substantial drop in the static back pressure in said exhaust chamber.

No references cited.

MARK NEWMAN, *Primary Examiner.*